May 25, 1937.  A. V. RHODES  2,081,183
PLATE SUPPORT FOR PLATE AND FRAME PRESSES
Filed Nov. 20, 1935
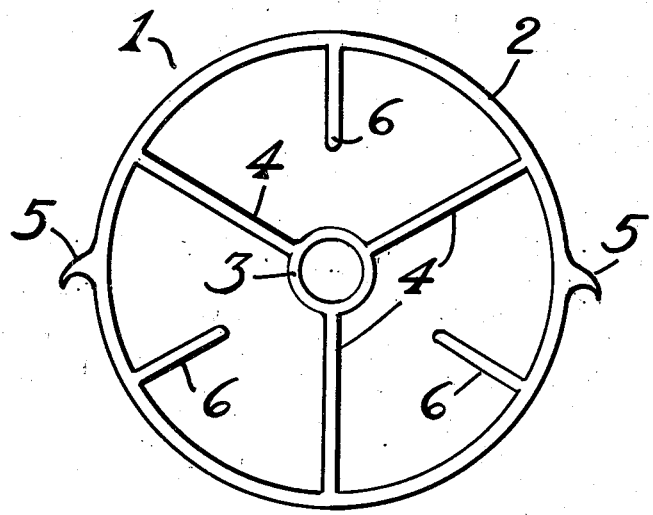
Audsley V. Rhodes Inventor
By W. E. Currie Attorney Patented May 25, 1937

2,081,183

UNITED STATES PATENT OFFICE 2,081,183

PLATE SUPPORT FOR PLATE AND FRAME PRESSES

Audsley V. Rhodes, Elizabeth, N. J., assignor to Standard Oil Development Company, a corporation of Delaware Application November 20, 1935, Serial No. 50,701

1 Claim. (Cl. 210—188)

This invention has for its object a means for preventing buckling or distortion of the plates in a plate and frame filter press by the pressure maintained on the press during the filtering operation.

The invention may be fully understood from the specification read in connection with the accompanying drawing, in which—

The figure is a plan view of a separator ring.

Referring to the drawing which is a plan view of one form of separator ring for use in a plate and frame filter press, numeral 1 denotes a separator ring having an outer annular member 2 and an inner annular member 3 connected by separator bars 4 extending radially outward from the outer edge of the inner member 3 to inner edge of the outer member 2. Numeral 5 denotes brackets on the outer member 2 to support the ring in assembling the filter press. Numeral 6 denotes supplementary separator bars extending radially inward from the inner edge of the outer member 2 into spaced relationship with the outer edge of the inner member 3.

In using the separator ring constructed according to this invention a ring is placed between each plate in the press with the filter blankets secured to the plates. When pressure is applied to the press in the usual manner one filter plate is separated at its edge from the next by the thickness of the annular members of the ring and the radial separator bars 4 and 6 provide bearing surfaces for the surface of each plate and blanket which maintain the plates in substantially uniform relationship to each other throughout the filtering operation.

Other advantages to be derived from the use of separator rings constructed according to the invention are increased facility in separating the plates at the end of the filtering operation and ease in cleaning of the filter blankets.

The present invention is not to be limited by the particular details disclosed but only by the following claim in which it is intended to claim all novelty inherent in the invention as broadly as the prior art permits.

I claim:

In a frame and plate filter press means for preventing distortion of the plates comprising a ring adapted to be interposed between the respective plates, having inner and outer annular members connected by a plurality of spaced bars extending radially outward from the inner annular member and a plurality of bars spaced with relation to each other and to those first mentioned, extending radially inward from the outer annular member with their ends in spaced relation to the inner annular member and of the same width as the annular members whereby said annular members separate one plate from the other and said bars form a bearing surface for the filter plates and the blankets thereon.

AUDSLEY V. RHODES.